(12) United States Patent
Shimizu et al.

(10) Patent No.: US 6,976,556 B2
(45) Date of Patent: Dec. 20, 2005

(54) ELECTRIC POWER STEERING APPARATUS

(75) Inventors: Yasuo Shimizu, Wako (JP); Katsuji Watanabe, Wako (JP); Yasuhiro Terada, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 0 days.

(21) Appl. No.: 10/618,476

(22) Filed: Jul. 11, 2003

(65) Prior Publication Data

US 2004/0026160 A1 Feb. 12, 2004

(30) Foreign Application Priority Data

Aug. 6, 2002 (JP) ............................. 2002-228424
Aug. 6, 2002 (JP) ............................. 2002-228460

(51) Int. Cl.[7] .............................................. B62D 5/06
(52) U.S. Cl. ..................................................... 180/444
(58) Field of Search ...................... 280/477; 116/28 R; 33/264; 180/443, 444, 445, 446; 74/425, 74/424.6, 427

(56) References Cited

U.S. PATENT DOCUMENTS

| | | | |
|---|---|---|---|
| 3,867,898 A * | 2/1975 | Lakamp .................... 116/28 R |
| 3,901,536 A | 8/1975 | Black ......................... 280/477 |
| 4,065,147 A * | 12/1977 | Ross ........................... 280/477 |
| 4,313,264 A * | 2/1982 | Miller, Sr. ..................... 33/264 |
| 4,583,481 A | 4/1986 | Garrison ................... 116/28 R |
| 4,621,432 A | 11/1986 | Law ............................. 33/264 |
| 4,666,176 A * | 5/1987 | Sand ........................... 280/477 |
| 4,687,220 A | 8/1987 | Danielson ................... 280/477 |
| 4,961,392 A * | 10/1990 | Ballard ....................... 114/161 |
| 5,035,441 A | 7/1991 | Murray ....................... 280/477 |
| 5,267,627 A * | 12/1993 | Frank et al. ................ 180/422 |
| 5,290,056 A | 3/1994 | Fath, IV ..................... 280/477 |
| 5,518,263 A | 5/1996 | Owens ........................ 280/477 |
| 5,669,621 A | 9/1997 | Lockwood .................. 280/477 |
| 5,680,706 A | 10/1997 | Talcott ......................... 33/286 |
| 6,042,136 A | 3/2000 | Heinecke .................... 280/477 |
| 6,168,181 B1 | 1/2001 | Gadd .......................... 280/477 |
| 6,273,448 B1 | 8/2001 | Cross ......................... 280/477 |
| 6,318,496 B1 * | 11/2001 | Koehler et al. ............. 180/444 |
| 6,390,230 B1 * | 5/2002 | Shimizu et al. ............. 180/444 |
| 6,516,915 B2 * | 2/2003 | Kurokawa et al. .......... 180/444 |
| 6,543,569 B1 | 4/2003 | Shimizu et al. |
| 6,557,663 B2 * | 5/2003 | Kurokawa et al. .......... 180/443 |
| 6,622,814 B2 * | 9/2003 | Kurokawa et al. .......... 180/444 |
| 6,626,261 B1 * | 9/2003 | Kurokawa et al. .......... 180/444 |
| 2002/0070529 A1 * | 6/2002 | Dravecz ..................... 280/477 |

FOREIGN PATENT DOCUMENTS

| | | |
|---|---|---|
| DE | 40 41 567 C2 | 12/1990 |
| DE | 100 49 570 A1 | 10/2000 |
| JP | 09030432 A | 2/1997 |
| WO | 99/11502 | 3/1999 |

OTHER PUBLICATIONS

Oberg, Erik, et. al., Machinery's Handbook, 23rd Edition, Industrial Press Inc., 1990., pp 1886.*

* cited by examiner

Primary Examiner—Kevin Hurley
(74) Attorney, Agent, or Firm—Hamre, Schumann, Mueller & Larson, P C.

(57) ABSTRACT

Electric power steering apparatus includes an electric motor for producing steering assist torque corresponding to steering torque applied to a steering system, and a worm gear mechanism for transmitting the steering assist torque to the steering system. The worm of the worm gear mechanism has a pressure angle greater than a pressure angle of the worm wheel, so as to reduce an actual meshing pitch circle diameter of the worm in the worm gear mechanism.

3 Claims, 9 Drawing Sheets

ELECTRIC POWER STEERING APPARATUS

FIELD OF THE INVENTION

The present invention relates generally to electric power steering apparatus, and more particularly to an improvement in worm gear mechanisms for transmitting steering assist torque from an electric motor to a steering system.

BACKGROUND OF THE INVENTION

In recent years, electric power steering apparatus have been popularly used to reduce steering force to be manually applied to a steering wheel by a human operator or driver and thereby achieve a comfortable steering feel. Such electric power steering apparatus are designed to produce steering assist torque, by means of an electric steering assisting motor, in accordance with steering force applied to the steering wheel, and then transmit the steering assist torque to a rack and pinion mechanism of a steering system. One example of the conventional electric power steering apparatus is proposed by Japanese Patent Laid-Open Publication No. HEI-9-30432. The proposed electric power steering apparatus will be outlined below with reference to FIGS. 8, 9 and 10.

Figure 8:
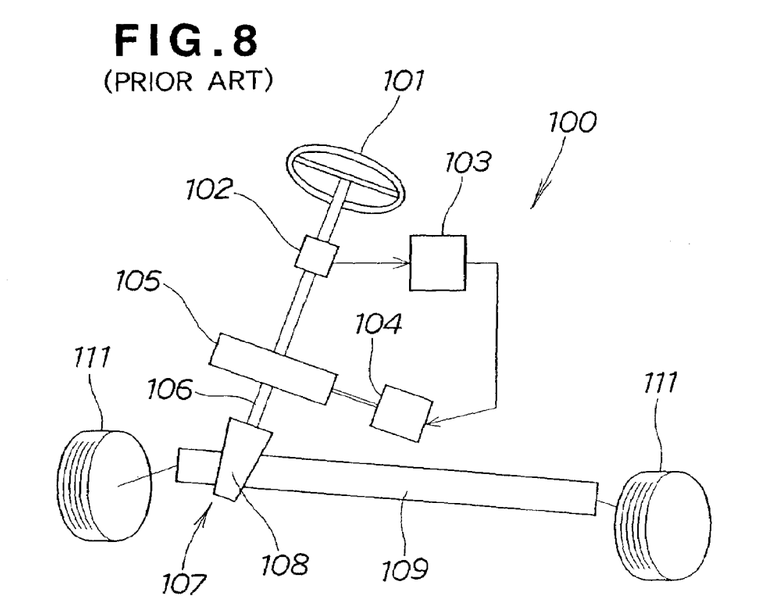
FIG. 8 is a schematic view of a conventional electric power steering apparatus.

In the conventional electric power steering apparatus proposed in the No. HEI-9-30432 laid-open publication, as shown in FIG. 8, a steering torque sensor 102 detects steering torque applied to the steering wheel 101, a control device 103 generates a control signal on the basis of a torque detection signal generated by the torque sensor 102, and an electric steering assisting motor 104 generates steering assist torque on the basis of the control signal generated by the control device. The thus-generated steering assist torque is transmitted to a pinion shaft 106 via a worm gear mechanism 105, and then delivered from the pinion shaft 106 to a rack and pinion mechanism 108 of a steering system 107. Steerable road wheels 111 are steered by composite torque, i.e. a combination of the driver-applied steering torque and steering assist torque from the motor 104, via a rack shaft 109.

Figure 9:
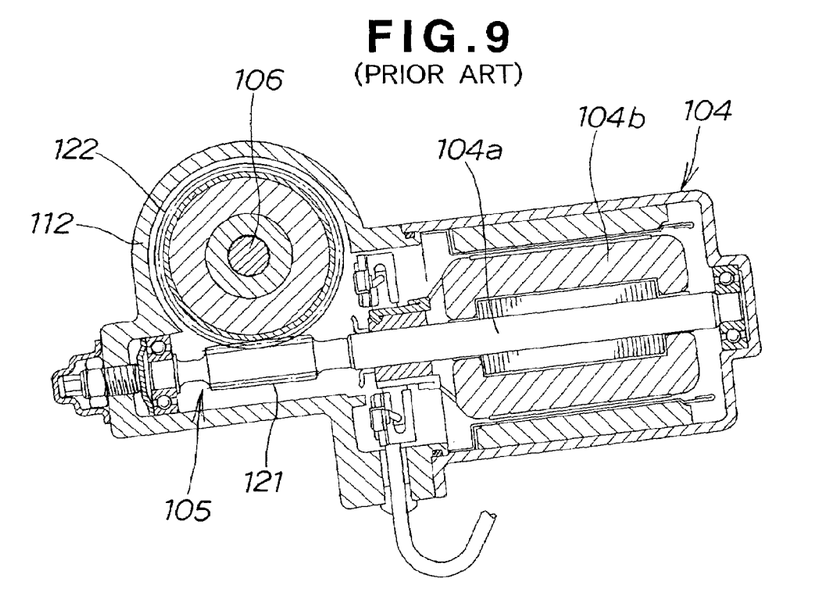
FIG. 9 is a sectional view of a conventional worm gear mechanism employed in the electric power steering apparatus of FIG. 8.

As illustrated in FIG. 9, the worm gear mechanism 105 includes a worm 121 formed on a rotation shaft 104a of the steering assisting motor 104, and a worm wheel 122 meshing with the worm 121 and coupled to the pinion shaft 106. Reference numeral 112 represents a housing.

In the worm gear mechanism 105 of the conventional electric power steering apparatus, the lead angle of threads of the worm 121 is set to be slightly greater than the friction angle of the thread surfaces; the reason is to allow the worm 121 to be rotated by the worm wheel 122. When the electric steering assisting motor 104 is not in operation or deactivated, i.e. when the motor 104 is not producing steering assist torque, the steerable wheels 111 can be steered freely only by the driver-applied steering torque. During that time, the rotor 104b of the assisting motor 104 is rotated by the driver-applied steering torque via the pinion shaft 106, worm wheel 122, worm 121 and motor's rotation shaft 104a.

Figure 10:
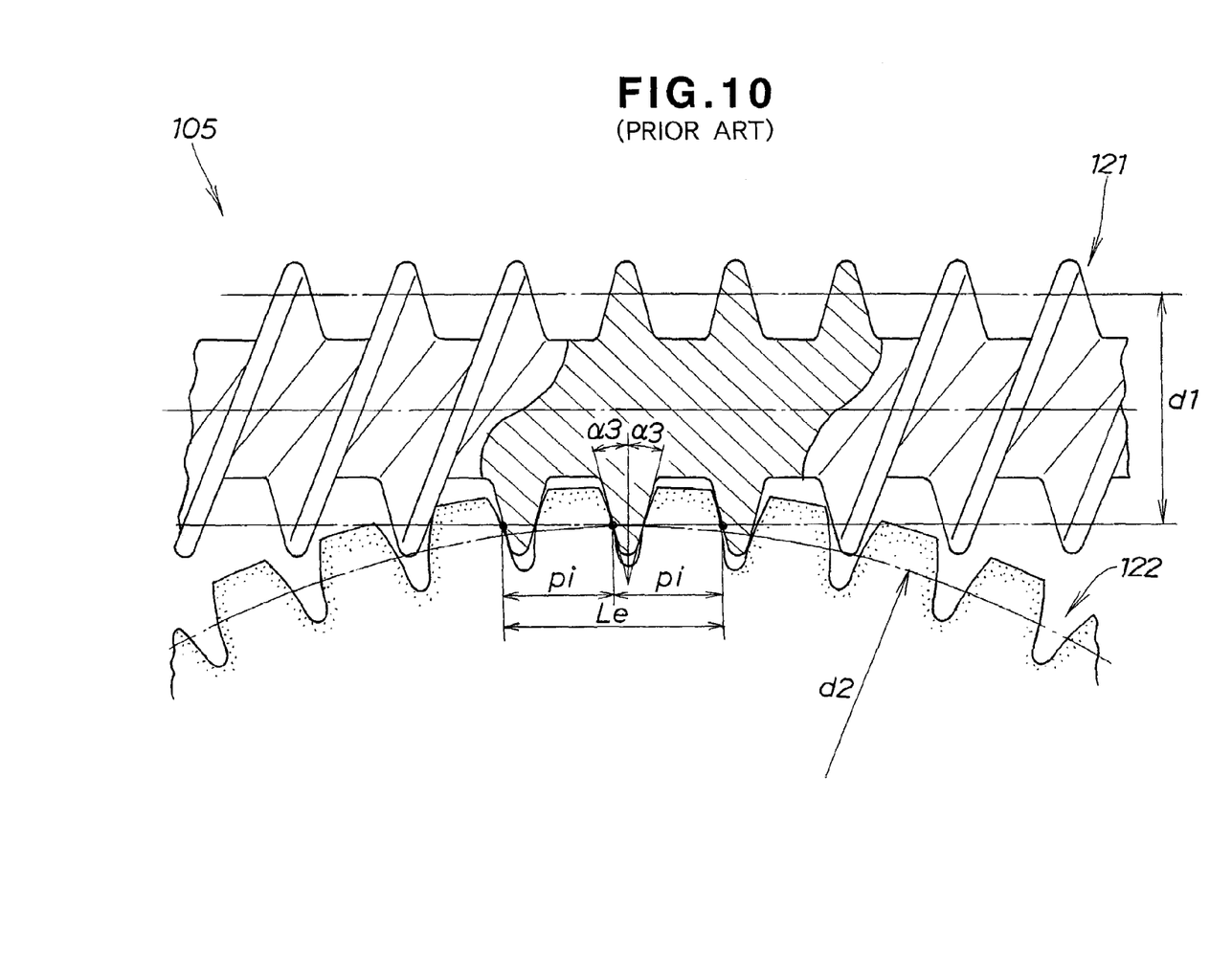
FIG. 10 is an enlarged view of a section where a worm and worm wheel mesh with each other in the conventional worm gear mechanism of FIG. 9.

It has been conventional to construct such a worm gear mechanism 105 of the electric power steering apparatus 100 in a manner as illustrated in FIG. 10. FIG. 10 shows how the worm 121 meshes with the worm wheel 122.

The worm 121 has a pitch circle diameter d1, while the worm wheel 122 has a pitch circle diameter d2. The worm 121 is a so-called "double-thread worm". The lead Le of the worm wheel 122 is twice as great as the pitch pi (Le=2×pi). Here, the "lead" means an amount of an axial advance per helical turn of threads. The worm 121 and worm wheel 122 each have a pressure angle $\alpha 3$.

In the electric power steering apparatus, when the electric steering assisting motor 104 is not in operation, i.e. when the motor 104 is not producing steering assist torque, the driver-applied steering torque is subjected to undesirable influences of inertia of the motor 104 and meshing resistance of the worm gear mechanism 105. Thus, it is preferable that such influences be as small as possible. Particularly, the steering torque would be significantly influenced when variation has occurred in meshing resistance of the worm wheel 122 against the worm 121, i.e. frictional force of the sliding surface of the worm wheel 122 against the sliding surface of the worm 121, due to insufficient working accuracy, such as unevenness in finished roughness across the sliding surfaces. Because variation in the steering torque would prevent smooth maneuver or operation of the steering wheel 101, it is preferable to minimize the steering torque variation, in order to improve the steering feel.

Further, in the worm gear mechanism 105 employing the double-thread worm 121, first and second threads of the worm 121 simultaneously mesh with at least two teeth of the worm wheel 122; namely, in this case, the contact ratio is "2". Therefore, theoretically, smooth mesh can be expected which may produce relatively small meshing variation, and influences of the meshing resistance of the worm gear mechanism 105 can be lessened effectively. In fact, however, variation would occur in the meshing resistance of the worm wheel 122 against the worm 121, i.e. the frictional force between the sliding surfaces, due to influences of insufficient working accuracy etc., as noted above. Particularly, because the worm 121 is a double-thread worm, there is a need to make the accuracy of the pitch pi of the first thread and the accuracy of the pitch pi of the second thread as equal as possible. If the accuracy of the pitch pi of the first thread and the accuracy of the pitch pi of the second thread is not equal to each other, then the frictional force between the sliding surfaces would vary, which undesirably influences the steering torque.

Namely, the undesirable influences of the accuracy of the pitches pi are substantial and may sometimes overweigh the benefits of the enhanced contact ratio. Because variation in the steering torque would disturb smooth maneuver of the steering wheel 101, it is preferable to minimize the steering torque variation, in order to improve the steering feel.

For reduction in the variation amount of the frictional force between the sliding surfaces, it may be considered useful to enhance the working and assembling accuracy of the worm 121 and worm wheel 122. However, merely enhancing such working and assembling accuracy would increase the total number of necessary control steps and hence necessary costs, and is not an advisable approach; thus, there is a room for further improvement.

Therefore, in the electric power steering apparatus, it is desirable to even further improve the steering feel by reducing the amount of variation in steering torque that would be produced due to variation in the meshing resistance (frictional force) of the worm gear mechanism.

SUMMARY OF THE INVENTION

The present invention provides an electric power steering apparatus of a type which comprises: a steering system; an electric motor for producing steering assist torque corresponding to steering torque applied to the steering system; and a worm gear mechanism for transmitting the steering assist torque to the steering system. The worm gear mechanism includes a worm operatively connected to the electric motor and a worm wheel operatively connected to the steering system and meshing with the worm, and the worm has a pressure angle greater than a pressure angle of the worm wheel.

With the pressure angle of the worm greater than the pressure angle of the worm wheel, the worm gear mechanism of the present invention can cause the meshing position of the worm wheel, at which the worm wheel meshes with the worm, to be displaced radially inward of the worm so that the actual meshing pitch circle diameter of the worm is reduced. The lead angle of the worm increases in correspondence with such reduction in the actual meshing pitch circle diameter.

Let's now consider a particular case where the electric steering assisting motor has been rotated by steering torque. Torque with which the worm rotates the rotor of the steering assisting motor is substantially constant.

As the meshing resistance of the worm wheel against the worm, i.e. frictional force of the sliding surface of the worm wheel against the sliding surface of the worm, increases due to insufficient working accuracy etc., an extra rotational force corresponding to the increase in the frictional force is applied to the worm wheel. The thus-applied extra rotational force causes a worm wheel tooth to be slightly deformed, so that the meshing position of the worm wheel, at which the worm wheel meshes with the worm, is displaced radially outwardly of the worm. As a consequence, the actual meshing pitch circle diameter of the worm increases, and thus the rotational force of the worm decreases by an amount corresponding to the increase in the meshing pitch circle diameter. In this way, the extra rotational force due to the increase in the frictional force between the sliding surfaces can be appropriately compensated by the decrease in the rotational force of the worm. Therefore, the rotational force of the worm wheel can promptly revert to generally the same intensity as the original one.

When there has occurred variation in the frictional force between the sliding surfaces of the worm wheel and worm due to insufficient working accuracy etc., it is possible to even more effectively reduce the amount of variation in the rotational force of the worm wheel. The reduced amount of variation in the steering torque allows the driver to operate the steering wheel with increased smoothness. As a result, the present invention can even further improve the steering feel.

In addition, the present invention can eliminate the need for enhancing the working and assembling accuracy of the worm and worm wheel in order to reduce the amount of variation in the frictional force of the worm wheel against the worm, which can thereby eliminate the need for a particular control step to enhance the manufacturing and assembling accuracy and thereby reduce the costs of the electric power steering apparatus.

The present invention also provides an electric power steering apparatus which comprises: a steering system; an electric motor for producing steering assist torque corresponding to steering torque applied to the steering system; and a worm gear mechanism for transmitting the steering assist torque to the steering system, and which is characterized in that the worm gear mechanism includes a worm operatively connected to the electric motor and a worm wheel operatively connected to the steering system and meshing with the worm and in that the worm is a single-thread worm.

In the present invention where the worm is a single-thread worm, the pitch accuracy of threads of the worm can be enhanced with ease, and the pitch accuracy need not be so strictly uniform between the threads of the worm, as compared to the conventional plural-thread worm. As a consequence, the present invention can reduce the amount of variation in the steering torque that would be produced due to variation in the frictional force between the sliding surfaces, thereby allowing the human driver to operate the steering wheel with even further increased smoothness.

Preferably, in the present invention, the worm is made of metal while the worm wheel is made of resin, and the worm wheel has a tooth thickness greater than a tooth height. The metal-made worm and the resin-made worm wheel can mesh with each other relatively smoothly, which can effectively lessen noise sound. Further, because the resin-made worm wheel with relatively small rigidity has a relatively great tooth thickness, each of the worm wheel teeth can have sufficient rigidity.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
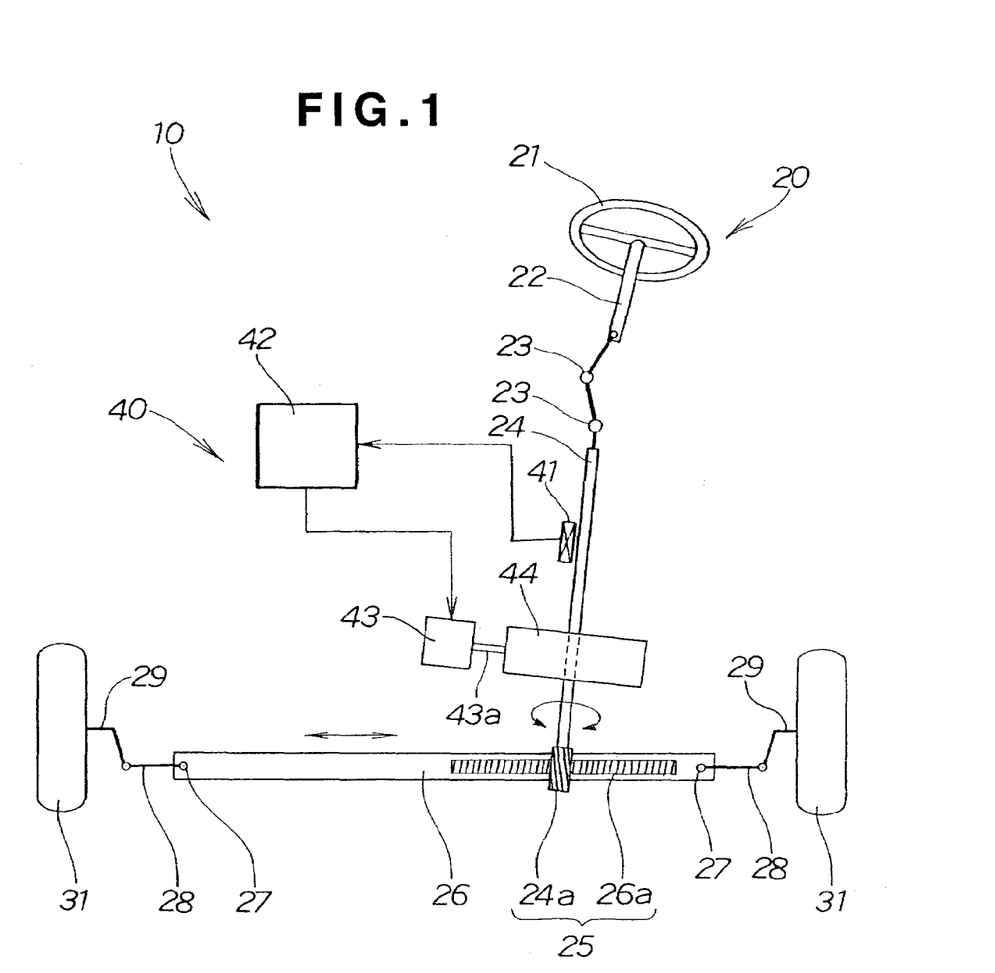
FIG. 1 is a schematic view of an electric power steering apparatus, which shows various components of the apparatus from a steering wheel to steerable wheels.
Figure 2:
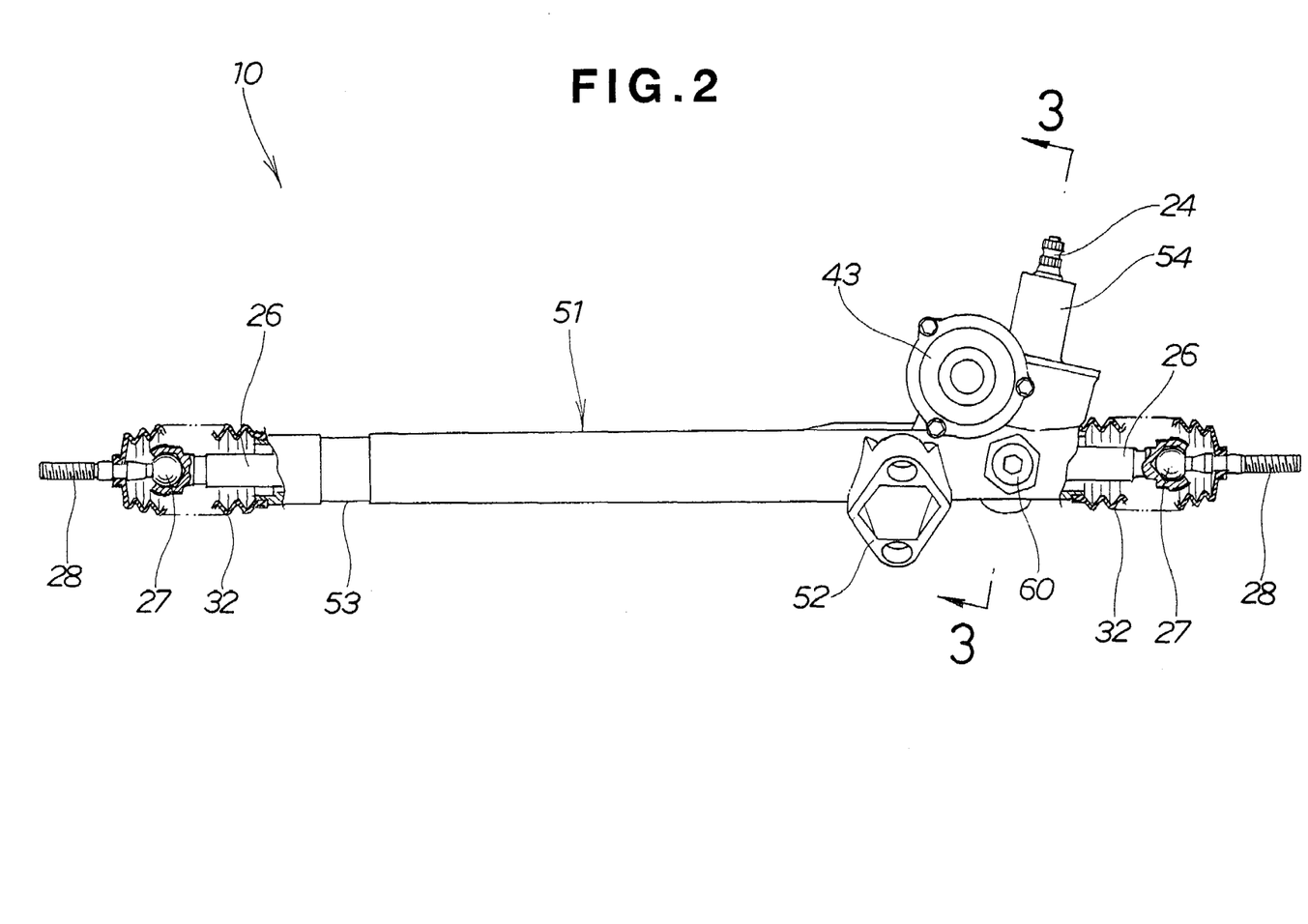
FIG. 2 is a front view of the electric power steering apparatus, which shows a rack shaft of FIG. 1 accommodated in a housing.

Initial reference is made to FIGS. 1 and 2 illustrating an electric power steering apparatus 10 for a motor vehicle in accordance with an embodiment the present invention, which comprises a steering system 20 extending from a steering wheel 21 of the vehicle to steerable road wheels (left and right front wheels) 31. The steering system 20 includes a steering assist torque mechanism 40 for supplying steering assist torque to the steering mechanism 20.

The steering system 20 includes a pinion shaft (input shaft) 24 connected to the steering wheel 11 via a steering shaft 22 and universal joints 23, and a rack shaft 26 connected to the pinion shaft 24 via a rack and pinion mechanism 25. The left and right steerable road wheels 31 are connected to opposite ends of the rack shaft 26 via left and right ball joints 27, left and right tie rods 28 and left and right knuckles 29.

The rack and pinion mechanism 25 includes a pinion 24a formed on the pinion shaft 24, and a rack 26a formed on the rack shaft 26.

As a vehicle driver maneuvers the steering wheel 21, the left and right steerable road wheels 31 are steered, in accordance with steering torque manually applied by the vehicle driver, via the rack and pinion mechanism 25 and left and right tie rods 28.

In the steering assist torque mechanism 40, a steering torque sensor 41 detects steering torque applied to the steering wheel 21, a control device 142 generates a control signal on the basis of a torque detection signal generated by the torque sensor 41, and an electric steering assisting motor 43 generates steering assist torque on the basis of the control signal. The thus-generated steering assist torque is transmitted to the pinion shaft 24 via a worm gear mechanism 44, and then delivered from the pinion shaft 24 to the rack and pinion mechanism 25 of the steering system 20.

The steerable road wheels 31 are steered by a composite torque, i.e. a combination of the driver-applied steering torque and steering assist torque from the motor 43 via the rack shaft 26.

As illustrated in FIG. 2, the rack shaft 26 of the electric power steering apparatus 10 is axially slidably accommodated in a housing 51 extending in a widthwise direction of the vehicle. The housing 51 has mounting sections 52 and 53 for attachment to the body (not shown) of the vehicle. Dust sealing boots 32 are provided at opposite ends of the housing 51.

Figure 3:
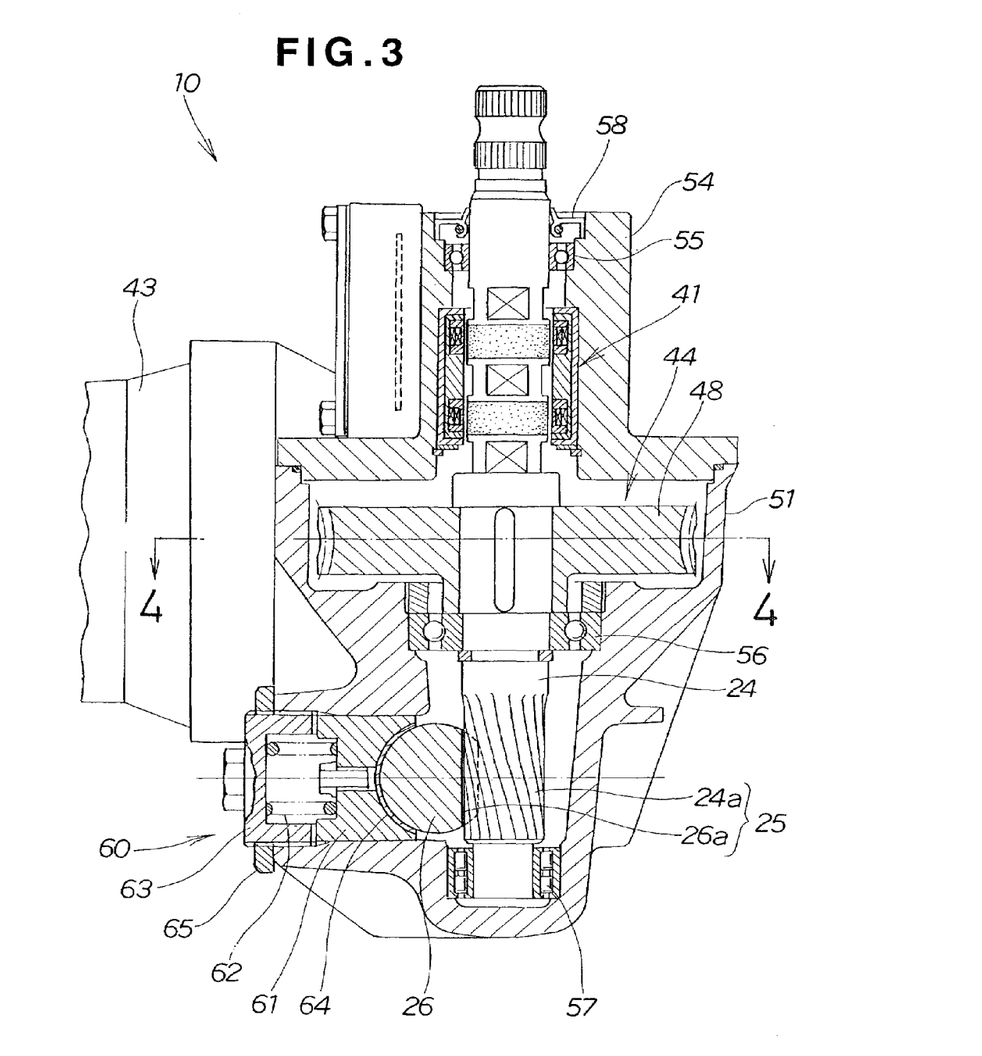
FIG. 3 is a sectional view taken along the 3—3 line of FIG. 2, which shows a rack guide in the electric power steering apparatus.

Reference is made next to FIG. 3 showing a rack guide 60 in the electric power steering apparatus 10.

The housing 51 accommodates the pinion shaft 24, rack and pinion mechanism 25, steering torque sensor 41 and worm gear mechanism 44. Lid 54 closes a top opening of the housing 51. Also, the housing 51 rotatably supports, via three sets of bearings 55–57, upper and lower end portions and longitudinal middle portion of the pinion shaft 24, and it includes the rack guide 60.

The rack guide 60 is a means for pressing a back surface of the rack shaft 26 opposite from a rack shaft's surface having the rack 26a, and it has a guide portion 61 contacting the back surface of the rack shaft 26 and an adjusting bolt 63 for adjustably pressing the guide portion 61 via an adjusting spring 62 such as a compression spring.

The guide section 61 supports the rack shaft 26 in such a manner that the rack shaft 26 can slide axially, while restricting movement of the rack shaft 26 in a longitudinal direction of the pinion shaft 24. The guide portion 61 is pressed with an appropriate pressing force by the adjusting bolt 63, screwed in the housing 51, via the adjusting spring 62, so that the rack 26a is pressed, via the guide portion 61, against the pinion 24a. In the figure, reference numeral 58 represents an oil seal, 64 a pad via which the back surface of the rack shaft 26 axially slides along the guide portion 61, and 65 a lock nut.

Figure 4:
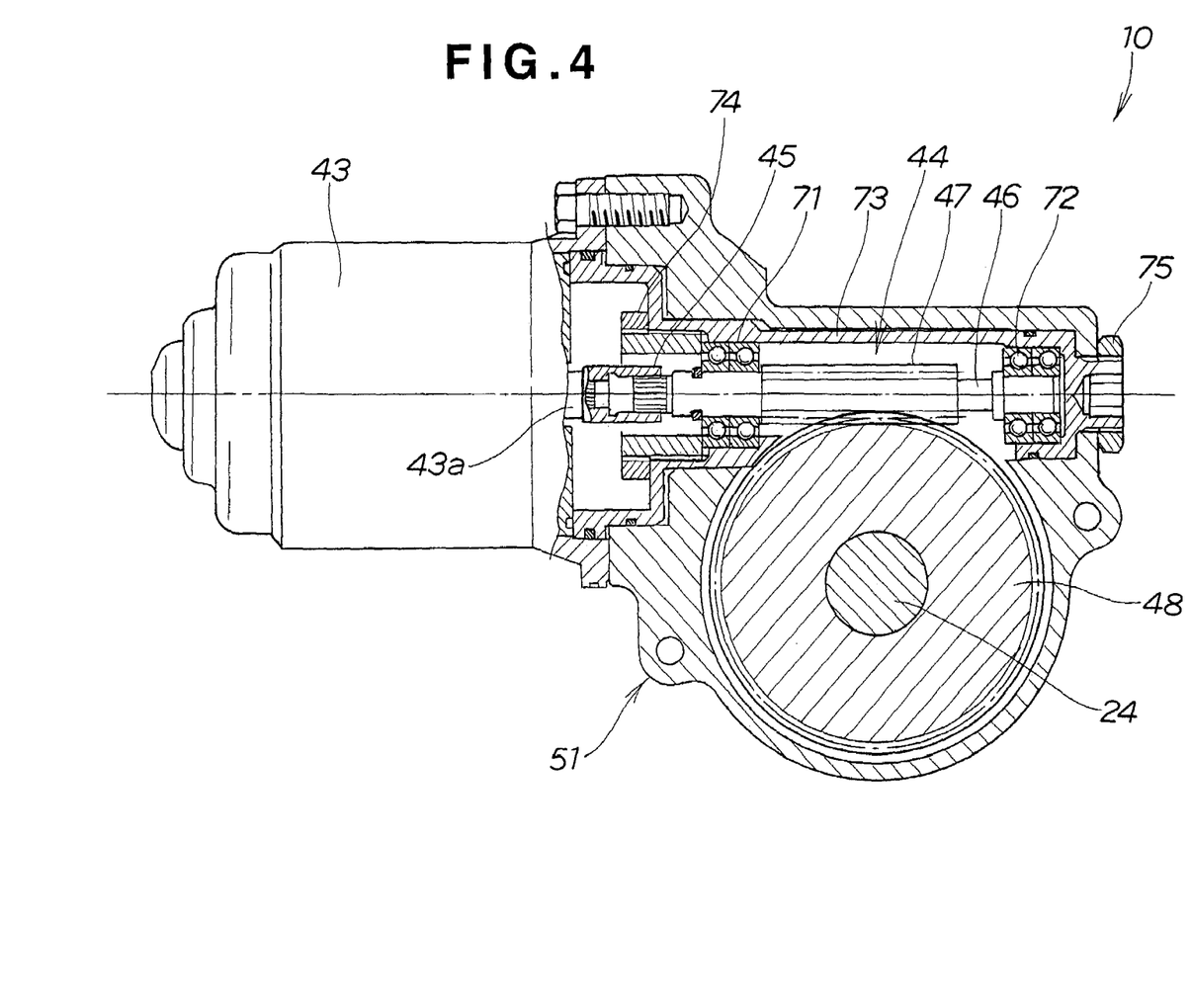
FIG. 4 is a sectional view taken along the 4—4 line of FIG. 3, which shows relationship among a pinion shaft, steering assisting motor and worm gear mechanism.

Next, reference is made to FIG. 4 showing a relationship among the pinion shaft 24, the steering assisting motor 43 and the worm gear mechanism 44.

The steering assisting motor 43 is mounted to the housing 51 with its rotation shaft 43a extending in a horizontal direction within the housing 51.

The worm gear mechanism 44 is a steering assist torque transmission mechanism, i.e. power-up mechanism, for transmitting steering assist torque, generated by the motor 43, to the pinion shaft 24. Specifically, the worm gear mechanism 44 includes a worm shaft 46 connected via a coupling 45 to the rotation shaft 43a of the steering assisting motor 43, a worm formed on the worm shaft 46, and a worm wheel 48 meshing with the worm 47. The worm wheel 48 is coupled to the pinion shaft 24.

Stated briefly, the worm gear mechanism 44 comprises a meshing engagement between the worm 47 operatively connected to the steering assisting motor 43 and the worm wheel 48 operatively connected to the steering system 20 (see FIG. 1).

The horizontal worm shaft 46 is rotatably supported at its opposite ends by the housing 51 via bearings 71 and 72 and hollow eccentric sleeve 73. Reference numerals 74 and 75 represent nuts. By just turning the eccentric sleeve 73, it is possible to adjust a backlash of the worm 47 relative to the worm wheel 48.

Figure 5:
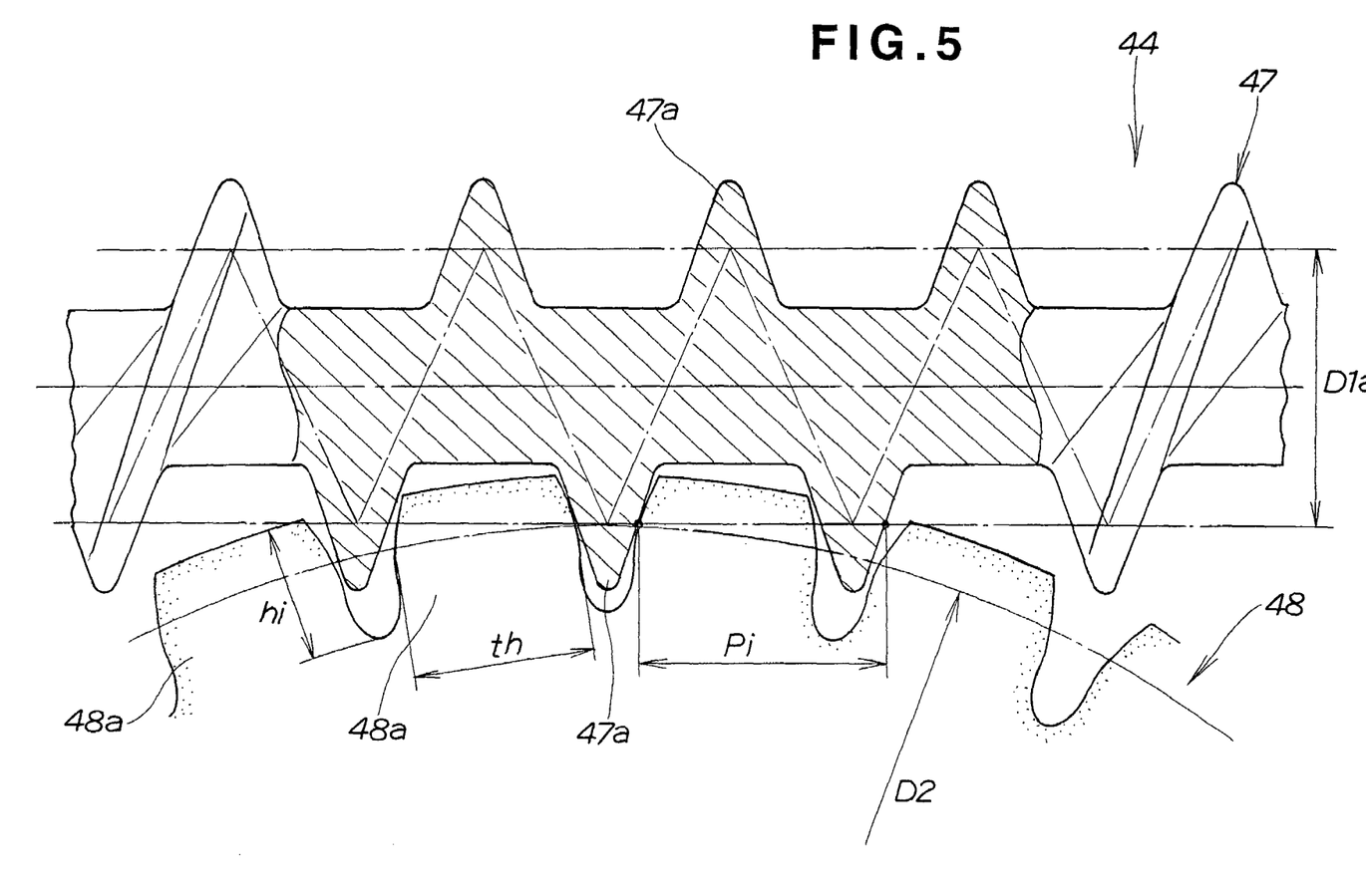
FIG. 5 is an enlarged view of the worm gear mechanism, which shows how a worm and worm wheel of the mechanism mesh with each other.

Reference is made next to FIG. 5 showing how the worm 47 meshes with the worm wheel 48.

The worm 47 is made of metal, e.g. steel such as machine structural carbon steel (JIS-G-4051). The worm wheel 48 is made of resin, such as nylon (trademark of Dupont) resin. Meshing engagement between the metal-made worm 47 and the resin-made worm wheel 48 can be relatively smooth and thus can reduce undesired noise sound.

Each tooth 47a of the worm 47 has a substantially trapezoidal shape as viewed in a direction perpendicular to the axis of the worm 47, while each tooth 48a of the worm wheel 48 has an involute sectional shape as viewed in a direction perpendicular to the axis of the worm wheel 48.

As viewed in the direction perpendicular to the axis of the worm wheel 48, each tooth 48a is shaped such that it's distal end portion (tooth top) gently links with an involute and it has an arcuate surface having a reference pitch line of the worm wheel 48 as a substantial center thereof. Therefore, the teeth 47a of the worm 47 and the teeth 48a of the worm wheel 48 can contact each other smoothly. Consequently, it is possible to reduce the amount of variation in the steering torque that would result from variation in the frictional force of the sliding surface of the worm wheel 48 against the sliding surface of the worm 47, thereby permitting smooth operation of the steering wheel 21 (see FIG. 1). As a result, an improved steering feel is achieved.

The worm 47 has a pitch circle diameter D1a, while the worm wheel 48 has a pitch circle diameter D2. In the present invention, the worm 47 is a single thread worm. Pitch pi of the threads of the worm 47 is identical to the lead Le of the conventional worm 121 described earlier in relation to FIG. 10.

Because the worm 47 is a single-thread worm, the accuracy of the pitch Pi of the threads can be enhanced with utmost ease. Also, unlike the conventional double-thread worm 121 of FIG. 10, there is no need to provide uniform pitch accuracy for the individual threads. Therefore, it is possible to effectively reduce the amount of variation in the steering torque that would result from the variation in the frictional force of the sliding surface of the worm wheel 48 against the sliding surface of the worm 47, thereby permitting smooth operation of the steering wheel 21 (see FIG. 1). As a result, an improved steering feel is achieved.

The tooth thickness of conventional worm wheels is about half (½) the pitch Pi of threads. By contrast, in the worm wheel 48 of the present invention, the tooth thickness th is set to be greater than the tooth height hi (overall tooth height hi). Specifically, the ratio of the tooth height hi to the tooth thickness th in the worm wheel 48 is about 1.0:1.3. Further, the ratio of the thread pitch pi to the tooth thickness th in the worm wheel 48 is about 1.0:0.7.

The worm 47 made of metal has great rigidity and is therefore very difficult to deform, while the worm wheel 48 made of resin has relatively small rigidity and is therefore easier to deform than the worm 47. The great tooth thickness th of the worm wheel 48 can suppress resilient deformation of the teeth 48a. With the great tooth thickness th of the worm wheel 48, made of resin having small rigidity, as compared to the metal-made worm 47, it is possible to secure sufficient rigidity of the teeth 48a of the worm wheel 48.

Figure 6:
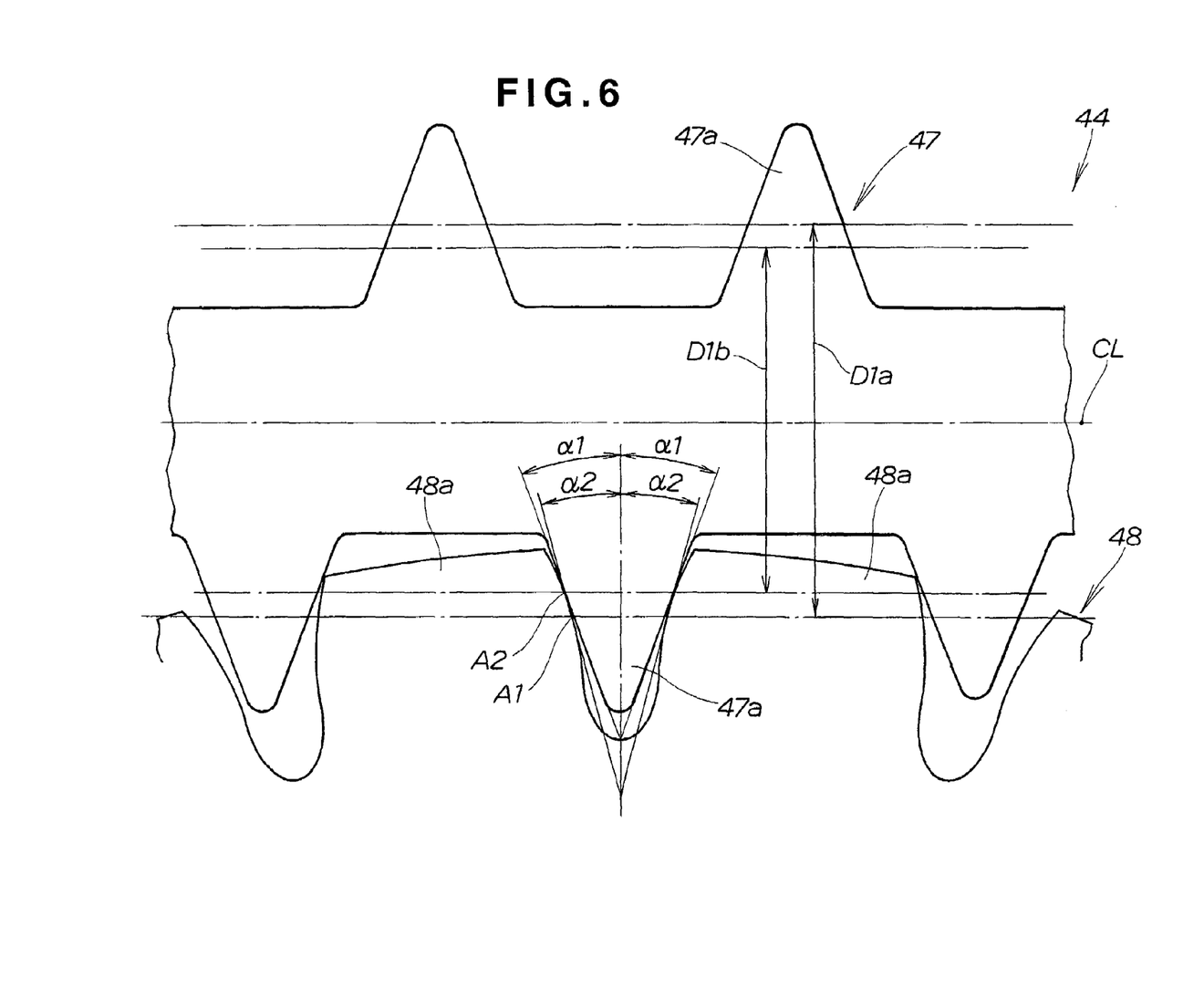
FIG. 6 is an enlarged view of a section where the worm and worm wheel mesh with each other.

FIG. 6 shows in enlarged scale the meshing engagement of the worm wheel 48 with the worm 47 outlined in FIG. 5.

In conventional worm gear mechanisms, the pressure angle α1 of the worm 47 and the pressure angle α2 of the worm wheel 48 are identical to each other. Here, the "pressure angle" means an angle made by the tangent of the tooth profile curve in the pitch circle and the centerline between two adjacent tangents. In this case, the tooth 48a of the worm wheel 48 meshes with the tooth 47a of the worm 47 at points A1. The diameter D1a passing point A1 constitutes a theoretical (virtual pitch circle diameter) of the worm 47.

As compared to the conventional worm gear mechanisms, the pressure angle α1 of the worm 47 in the worm gear mechanism 44 of the present invention is set to be greater than the pressure angle α2 of the worm wheel 48. In this case, the tooth 48a of the worm wheel 48 meshes with the tooth 47a of the worm 47 at point A2 that is closer to a center CL of the worm 47 than point A1. Namely, a portion of the worm wheel tooth 48a adjacent to the tooth top meshes with a portion of the worm tooth 47a adjacent to the tooth bottom of the tooth 47a. The diameter D1b passing point A2 constitutes an actual pitch circle diameter of the worm 47, which is smaller than the theoretical (virtual pitch circle diameter) D1a of the worm 47 (D1a>D1b).

Further, in the worm gear mechanism 44 of the present invention, the lead angle of the threads of the worm 47 is set to be slightly greater than the friction angle of the thread surfaces, so that the worm 47 can be rotated by the worm wheel 48.

Now, operation of the electric power steering apparatus 10 will be described with primary reference to FIGS. 1, 4, 6, 7A and 7B.

When the electric steering assisting motor 43 of FIG. 1 is not in operation, i.e. when the motor 43 is not producing steering assist torque, the steerable wheels 31 can be steered freely only by the driver-applied steering torque. During that time, the rotor (not shown) of the steering assisting motor 43 is rotated by the driver-applied steering torque via the pinion shaft 24, worm wheel 48, worm 47 and worm shaft 46, as illustrated in FIG. 4.

Figure 7A:
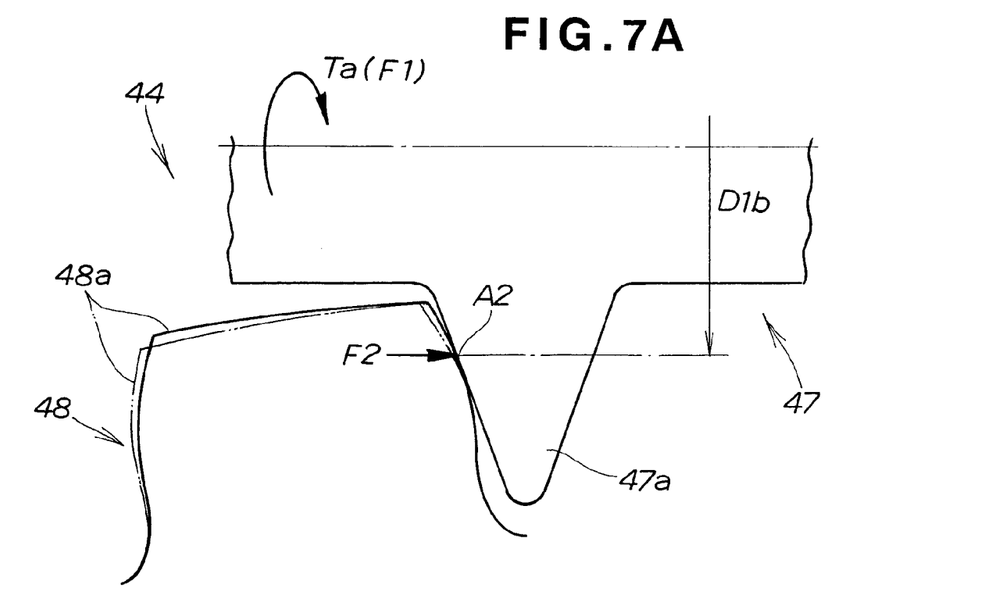
FIGS. 7A and 7B are views showing various forces produced as teeth of the worm and worm wheel shown in FIG. 6 are brought into meshing engagement with each other.

As the worm wheel 48 is rotated by the steering torque, the worm wheel 48 produces an axial force F2 acting on the worm 47, as illustrated in FIG. 7A; the axial force F2 is a force acting in the pitch circle direction, i.e. rotational force of the worm wheel 48.

When the rotor (not shown) of the steering assisting motor 43 not in operation is rotated by the driver-applied steering torque via the steering wheel 21, the intensity of a force F1 in the pitch circle direction of the worm 47, i.e. rotational force F1 of the worm 47, is inversely proportional to the pitch circle diameter, if torque rotating the rotor is represented by Ta.

In the case where the worm 47 is rotated by the worm wheel 48, relationship between the rotational force F1 of the worm 47 and the rotational force F2 of the worm wheel 48 can be determined using Mathematical Expression (1) below.

$$F1 = F2 \times \tan(\gamma - \rho), \quad (1)$$

where γ represents the lead angle at a pitch point of the worm 47 and ρ represents the friction angle of a thread surface.

From Mathematical Expression (1), it may be seen that the friction angle ρ of the thread surface influences the rotational force F2 of the worm wheel 48. The friction angle ρ is based on a coefficient of sliding-surface friction of the worm wheel 48 against the worm 47. The friction coefficient is influenced, for example, by the working accuracy of the worm 47 and worm wheel 48, such as finished surface roughness of the sliding surfaces.

When the worm wheel 48 is rotated, and if the frictional force varies per rotation of the worm wheel 48, the rotational force F2 would vary in accordance with the varying frictional force. Because the variation in the rotational force F2 undesirably influences the steering torque, it is preferable to minimize the variation in the rotational force F2.

Thus, in the present invention, the pressure angle α1 of the worm 47 is set to be greater than the pressure angle α2 of the worm wheel 48, as shown in FIG. 6. Therefore, as illustrated in FIG. 7A, the worm wheel tooth 48a meshes with the worm tooth 47a at point A2, and the worm 47 is rotated by the rotational force F2 of the worm wheel 48 produced at point A2.

Figure 7B:
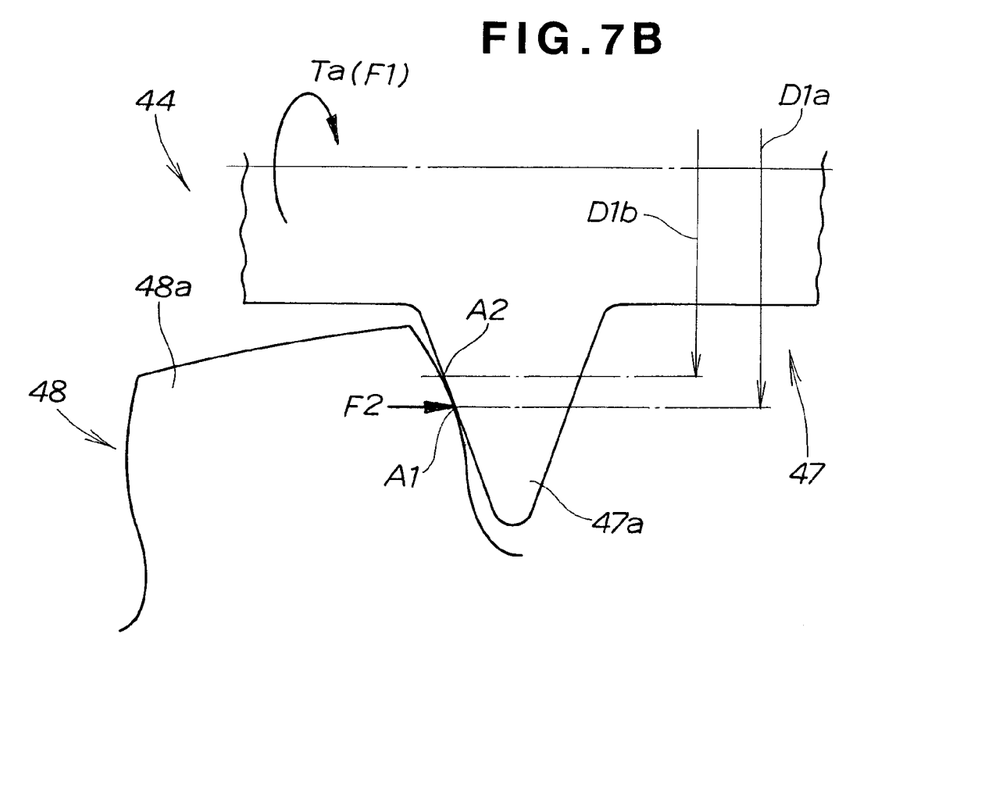

The worm wheel tooth 48a indicated by a solid line in FIG. 7 is resiliently deformed very slightly, due to the reaction force of the rotational force F2, in such a manner that the tooth 48a moves away from the worm tooth 47a in a direction of the tooth thickness as depicted by a phantom line. As a consequence, the meshing position, at which the worm wheel tooth 48a meshes with the worm tooth 47a, slightly shifts radially outwardly of the worm 47 as illustrated in FIG. 7B.

More specifically, the torque Ta rotating the rotor of the steering assisting motor 43 (see FIG. 4) is substantially constant. If the pitch circle diameter of the worm 47 is D1b with the lead angle γ and the thread surface friction angle ρ is constant, the rotational force F1 of the worm 47 can be constant, and so can be the rotational force F2 of the worm wheel 48.

When the worm wheel 48 is rotated, and if the friction coefficient varies per rotation of the worm wheel 48 due to finished roughness of the sliding surfaces, the thread surface friction angle ρ would vary in response to the varying friction coefficient, and the rotational force F2 of the worm wheel 48 would also vary in response to the varying friction angle ρ. Increase in the rotational force F2 results in corresponding variation in the resilient deformation amount of the worm wheel tooth 48a. Thus, the meshing position, at which the worm wheel tooth 48a meshes with the worm tooth 47a, slightly shifts radially outwardly of the worm 47.

Here, let's consider a case where the meshing position is displaced, radially outwardly of the worm 47, from point A2 to point A1 in accordance with the intensity of the rotational force F2 and the meshing position is stabilized at point A1. In response to the shift or displacement of the meshing position, the point where the rotational force F2 is produced also shifts from point A2 to point A1.

Note that the variation amount of the lead angle γ is very nominal as compared to the amount of the variation, from the pitch circle diameter D1b to the diameter D1a, of the worm 47. Therefore, regarding Mathematical Expression (1) above, it does not substantially matter if the variation in the lead angle γ is ignored.

The pitch circle diameter D1a passing pint A1 is greater than the pitch circle diameter D1b passing pint A2. As noted earlier, the rotational force F1 of the worm 47 is inversely proportional to the pitch circle diameter of the worm 47. For example, the rotational force F1 of the worm 47 decreases as the pitch circle diameter of the worm 47 increases from D1b to D1a. Extra rotational force produced due to the increase in the frictional force is compensated by the decrease in the rotational force F1 of the worm 47. Therefore, the rotational force F2 of the worm wheel 48 can promptly revert to generally the same intensity as the original, so that the variation amount of the rotational force F2 can be lessened even more effectively. As a result, the amount of undesired variation in the steering torque can be minimized.

As set forth above, the worm gear mechanism 44 of the present invention can cause the meshing position of the worm wheel 48, at which the worm wheel 48 meshes with the worm 47, to be displaced radially inward of the worm 47 (from point A1 to point A2), by virtue of the pressure angle α1 of the worm 47 greater than the pressure angle α2 of the worm wheel 48. As a consequence, when a given tooth of the worm wheel 48 is brought into meshing engagement with a corresponding tooth of the worm 47, the actual meshing pitch circle diameter of the worm 47 can be reduced from D1a to D1b.

Let's now consider a case where the electric steering assisting motor 43 has been rotated by the steering torque while the motor 43 is not producing steering assist torque (e.g., while the motor 43 is not in operation or deactivated). Note that the torque Ta with which the worm 47 rotates the rotor of the steering assisting motor 43 is substantially constant.

As the meshing resistance of the worm wheel 48 against the worm 47, i.e. the frictional force of the sliding surface of the worm wheel 48 against the sliding surface of the worm 47, increases due to insufficient working accuracy etc., an extra rotational force corresponding to the increase is applied to the worm wheel 48.

The worm wheel tooth 48a is slightly deformed by the thus-applied extra rotational force. Thus, the meshing position of the worm wheel 48, at which the worm wheel 48 meshes with the worm 47, is displaced radially outwardly of the worm 47 (from point A2 to point A1). As a consequence, the actual meshing pitch circle diameter of the worm 47 increases from D1b to D1a, and the rotational force F1 of the worm 47 decreases by an amount corresponding to the increase in the meshing pitch circle diameter.

In this way, the extra rotational force due to the increase in the frictional force between the sliding surfaces of the worm wheel 48 and worm 47 can be compensated by the decrease in the rotational force F1 of the worm 47. Therefore, the rotational force F2 of the worm wheel 48 can promptly revert to generally the same intensity as the original; thus, the rotational force F2 of the worm wheel 48 is allowed to remain almost unvaried.

Thus, when there has occurred variation in the frictional force of the sliding surface of the worm wheel 48 against the sliding surface of the worm 47 due to insufficient working accuracy etc., it is possible to even more effectively reduce the amount of variation in the rotational force F2 of the worm wheel 48. Consequently, the amount of variation in the steering torque can be reduced, so that the driver is allowed to operate the steering wheel 21 with increased smoothness. As a result, the present invention can even further improve the steering feel.

In addition, there is no need for enhancing the working and assembling accuracy of the worm 47 and worm wheel 48, which can eliminate the need for a particular control step to enhance the working and assembling accuracy and can thereby reduce the costs of the electric power steering apparatus 10.

Furthermore, with the pressure angle α1 of the worm 47 greater than the pressure angle α2 of the worm wheel 48, the actual meshing pitch circle diameter of the worm 47 when a given tooth of the worm wheel 48 is brought into meshing engagement with a corresponding tooth of the worm 47 can be reduced from D1a to D1b. The lead angle γ of the worm 47 can be increased accordingly.

Transmission efficiency η with which the worm wheel 48 is rotated by the worm 47 can be derived using Mathematical Expression (2) below.

$$\eta = \tan\gamma / \tan(\gamma + \rho), \quad (2)$$

where γ represents the lead angle at the pitch point of the worm 47 and ρ represents the friction angle of the thread surface.

From Mathematical Expression (2), it may be seen that the transmission efficiency η can be increased in proportion as the lead angle γ increases.

The present disclosure relates to the subject matters of Japanese Patent Applications No. 2002-228424 and No. 2002-228460, both filed Aug. 6, 2002, the disclosures of which are expressly incorporated herein by reference in their entireties.

What is claimed is:

1. An electric power steering apparatus comprising:
a steering system;
an electric motor for producing steering assist torque corresponding to steering torque applied to said steering system; and
a worm gear mechanism for transmitting the steering assist torque to said steering system,
wherein said worm gear mechanism includes a worm operatively connected to said electric motor and a worm wheel operatively connected to said steering system and meshing with said worm, and said worm has a pressure angle greater than a pressure angle of said worm wheel.

2. An electric power steering apparatus comprising:
a steering system including a rack and pinion assembly;
an electric motor producing steering assist torque corresponding to steering torque applied to said steering system; and
a worm gear mechanism for transmitting the steering assist torque to said steering system,
wherein said worm gear mechanism includes a worm operatively connected to said electric motor and a worm wheel operatively connected to said steering system and meshing with said worm, and said worm is a single-thread worm,
wherein said worm is made of metal while said worm is made of resin, and wherein said worm wheel has a tooth thickness greater than a tooth height.

3. An electric power steering apparatus comprising:
a steering system including a rack and pinion assembly;
an electric motor producing steering assist torque corresponding to steering torque applied to said steering system; and
a worm gear mechanism transmitting the steering assist torque to said steering system,
wherein said worm gear mechanism includes a worm operatively connected to said electric motor and a worm wheel operatively connected to said steering system and meshing with said worm, and said worm is a single-thread worm,
wherein said worm has a pressure angle greater than a pressure angle of said worm wheel.

* * * * *